(12) United States Patent
Arai et al.

(10) Patent No.: US 7,708,477 B2
(45) Date of Patent: May 4, 2010

(54) FOCAL PLANE SHUTTER FOR CAMERAS

(75) Inventors: Koji Arai, Tokyo (JP); Shigemi Takahashi, Tokyo (JP); Nobuyoshi Inoue, Saitama (JP)

(73) Assignee: Nidec Copal Corporation, Tokyo (JP)

( * ) Notice: Subject to any disclaimer, the term of this patent is extended or adjusted under 35 U.S.C. 154(b) by 517 days.

(21) Appl. No.: 11/806,167

(22) Filed: May 30, 2007

(65) Prior Publication Data

US 2007/0292122 A1    Dec. 20, 2007

(30) Foreign Application Priority Data

May 31, 2006   (JP)   .............................. 2006-152065
Aug. 21, 2006  (JP)   .............................. 2006-224028

(51) Int. Cl.
*G03B 9/12*   (2006.01)
*G03B 9/08*   (2006.01)
*G03B 9/40*   (2006.01)

(52) U.S. Cl. ...................... 396/357; 396/463; 396/486; 396/487

(58) Field of Classification Search ................... 396/357
See application file for complete search history.

(56) References Cited

U.S. PATENT DOCUMENTS 6,726,381 B2 *   4/2004   Takahashi et al. ........... 396/486
6,880,988 B2 *   4/2005   Kurosu et al. ............... 396/463

FOREIGN PATENT DOCUMENTS

| JP | 1-280739 | 11/1989 |
| JP | 2000-2907 | 1/2000 |
| JP | 2004-101860 | 4/2004 |

* cited by examiner

*Primary Examiner*—Melissa J Koval
(74) *Attorney, Agent, or Firm*—Wenderoth, Lind & Ponack, L.L.P.

(57) ABSTRACT

In the focal plane shutter for cameras, a shutter base plate, an shank for attaching the first blade drive component and the second blade drive component respectively so as to enable to be rotated, an shank for attaching a set component so as to enable to be rotated, and an shank for attaching the first blade and the second blade so as to enable to be rotated respectively are made of synthetic resins. Each of the shanks is fabricated after a shutter base plate was fabricated beforehand, and grooves for sump having cross section of V letter shape are formed at the same interval of angle extending toward the axial direction of the shank at the circumferential side surfaces of the shanks.

14 Claims, 8 Drawing Sheets

FOCAL PLANE SHUTTER FOR CAMERAS

BACKGROUND OF THE INVENTION

1. Field of the Invention

The present invention relates to a focal plane shutter for cameras having one or two shutter blades.

2. Description of the Related Art

In focal plane shutters for cameras, one type in which two blade rooms are constituted between plate components of three sheet components called the shutter base plate, the middle plate, and the auxiliary base plate, and two shutter blades in which so called the first blade, and the second blade are arranged individually in the blade rooms, and another type in which one shutter blade is arranged in a blade room constituted between the shutter base plate and the auxiliary base plate have been known. The former type of the focal plane shutter can be used for a silver halide film camera as well as for a digital camera. However, the latter type of the focal plane shutter can be used only for a digital camera.

In any case of the focal plane shutters, constitutions of the shutter blades are almost same, and it is constituted by two or more arms, an end of the length direction of which is attached rotatably to the shutter base plate, and at least one blade which is pivoted by the arms. And, one of the arms is connected with a drive pin of a drive component rotatably attached to a shutter base plate, and is swung by the drive component, and an exposure aperture is made open and close by the blade.

As the drive component, for example, as shown in Publication of the Japanese unexamined patent application, Toku Kai.No. 2000-2907, and Japanese published unexamined patent application Toku Kai Hei No. 1-280739, it is rotated by the energized power of a drive spring to one direction, and to another direction, it may be rotated by a set component attached rotatably to a shutter base plate. However, recently, for example, as shown in Publication of the Japanese unexamined patent application, Toku Kai. No. 2004-101860, using of an electromagnetism actuator as a driving source has been also known. In that case, a component formed in one with a rotor made of permanent magnet is used as a drive component, and the drive pin is arranged on the rotor.

As mentioned above, in all cases of the focal plane shutter, besides the arm, the drive component and the set component, two or more attachment shanks for supporting of various rotation components so as to enable to be rotated are installed upright on the shutter base plate in order to rotate smoothly a rotation component, lubricant, grease, or the like is applied on those attachment shanks if needed. Particularly, for the drive component, a high speed and a stable rotation are required, and for the set component, rotation with low torque when setting is made. However, as well known, since a big power is applied to the drive component attachment shank and the set-component attachment shank to the radial direction, the attachment shanks are manufactured thicker than those of the other attachment shanks. Therefore, in order to reduce friction between the components and the attachment shanks and to raise durability, lubricant has been applied between those in many cases so far. In Japanese published unexamined patent application Toku Kai Hei No. 2000-2907, a constitution in which a groove for sump is formed annularly to a drive component attachment shanks and a blade attachment shank formed in one to the drive component attachment shank has been shown.

By the way, it is obvious that the attachment shank of the drive component shown in the publication of the Japanese unexamined patent application, Toku Kai No. 2000-2907 is made of metal, although no material is specified. Therefore, the attachment shank is installed upright to the shutter base plate by caulking processing, etc. However, recently, synthetic resin has been used for shutter parts remarkably, and it has been used not only for major parts such as a drive component and a set component, but also for almost of shutter base plate. Under such circumstance, attachment shanks of a drive component and a set component have been made of synthetic resin. In Japanese published unexamined patent application Toku Kai Hei No. 1-280739, an example of the shutter for cameras in which those attachment shanks are manufactured by simultaneous integral molding by synthetic resin material together with a shutter base plate has been shown.

Main problems when the integral molding of a shutter base plate and the attachment shank of rotation components is carried out simultaneously by synthetic resin material, is whether melting material poured in from a gate is filled suitably in a die, and a long and slender attachment shank is formed in predetermined form or not at the time of manufacture and after the time of manufacture, it is whether the attachment shank is inclined or destroyed by an external force, and heat deformation is caused or not. Then, in Japanese published unexamined patent application Toku Kai Hei No. 1-280739, it has been proposed that a considerable large area in near a part in which an attachment shank is installed upright is formed so as to have large wall thickness over the both sides of the front surface and the back surface of the area as a solution of such problems.

However, it cannot be said that such solution is good enough. Especially, in cases of a camera using film of APS (Advanced Photo System), and a focal plane shutter used for a digital camera using a solid state image pickup device having small imaging area, it is necessary to make the attachment shank thin as an exposure aperture becomes small, Therefore, there is a problem such that when the simultaneous integral molding is carried out, synthetic resin material does not flow suitably to a shank part from a base plate part, and a predetermined form and intensity cannot be easily obtained. Furthermore, by such solution mentioned above, it is substantially the same as the shutter base plate is made thick, and accordingly a size of the whole shutter in a direction along the optical shanks becomes large, and furthermore the space of a blade room also becomes large. Therefore, it becomes necessary to take another measures for stable run of the shutter blade, etc., which are derivative problems.

Recently, the attachment shanks of various rotation components are also manufactured by the synthetic resin material together with the base plate, and it has been fabricated by the synthetic resin material to the metal base plate. However, if an attachment shank is made of the synthetic resin in such ways mentioned above, for example, as shown in the publication of the Japanese unexamined patent application, Toku Kai No. 2000-2907, it becomes very difficult to form a groove for sump having annular shape. For example, as shown in publication of the Japanese unexamined patent application, Toku Kai Hei. 1-280739, when the attachment shanks are manufactured by the simultaneous integral molding together with the shutter base plate, usually, after the synthetic resin material is poured into a mold cavity, two main dies are separated in the thickness direction (direction of shank of an attachment shank) of the shutter base plate. Therefore, in order to form a groove annular as mentioned above, it is necessary to arrange further at least two slide dies, and to make them slide relatively in the direction which intersects perpendicularly with the direction of separation of the two main dies when the dies are separated.

Therefore, there is the other problem that cost becomes high by effects such that the structure of the whole dies not only becomes complicated by increasing parts of the dies in number, but also it becomes difficult to carry out two or more product-processing (picking of a plurality of products) by single shot, and to necessitate a high-class molding machine. Furthermore, when complicated slide dies are used in such way mentioned above, there is a problem such that a mark of a parting line is formed by the joint of two slide dies to the direction of the fabricated attachment shank, and it is not appropriate, as the attachment shank for rotating smoothly rotation components, such as a drive component and a set component.

SUMMARY OF THE INVENTION

Therefore, one of purposes of the present invention is to offer a focal plane shutter for cameras constituted so that attachment shanks may not be inclined, damaged, or destroyed after manufacture, even if the attachment shanks installed upright to the shutter base plates made of synthetic resin is formed thin by the synthetic resin material in order to attach a rotation component, Another purpose of the present invention is to offer a focal plane shutter for cameras in which grooves for sump of lubricant on attachment shanks made of the synthetic resin for attaching rotation components, such as a drive component and the like, can be formed suitably by low cost.

In order to attain the purposes, the focal plane shutter for cameras of the present invention comprises a shutter base plate having an aperture for exposure which is made of the synthetic resin; at least one shutter blade in which each end of arms is individually attached rotatably to two or more blade attachment shanks which consist of two or more arms and at least one blade pivoted on the arms, and is installed upright to the shutter base plate; and at least one drive component which is rotatably attached to the shutter base plate, and makes opening and closing operation of the aperture by the shutter blade by carrying out reciprocal rotation of one of the arms, wherein at least one attachment shank of the two or more attachment shanks which is installed upright in order to install a rotation component including the blade attachment shank is made of the synthetic resin; and the shutter base plate and the attachment shank are formed by such that after either of them is fabricated, the other is fabricated.

According to the present invention, when the attachment shank is fabricated on the shutter base plate after the shutter base plate was fabricated, the shutter base plate may have a circular shape pore, or non-circular shape pore at a position where the attachment shank is installed upright if it is before the attachment shank is fabricated and after the shutter base plate was fabricated. When the shutter base plate is fabricated on the attachment shanks after the attachment shanks was fabricated, the attachment shanks are formed so that a cross section of the shank part installed upright to the shutter base plate may be formed so as to have a circular shape pore, or non-circular shape pore if it is before the shutter base plate is fabricated and after the attachment shanks was fabricated.

When the shutter base plate and the attachment shanks are fabricated, the shutter base plate is inserted between two flange parts formed by fabrication of the attachment shanks. The attachment shanks is arranged so that the shank part installed upright to this shutter base plate may be laid under the shutter base plate. Thereby, the attachment shank will be installed upright out more firmly. In the latter case, it is more desired that as for the attachment shanks, at least a part of the shank part being laid under the shutter base plate is formed thicker than the shank part which is not laid under the shutter base plate. This constitution is advantageous when the rotation component attached to the attachment shanks is a component energized by a twisted spring to a direction of rotation.

According to the present invention, it may be constituted such that at least one of the rotation components is the drive component, and in order that the drive component is attached so as to enable to rotate at least one of the attachment shanks, is a drive component attachment shank installed upright to the shutter base plate, and the drive component attachment shanks may have the blade attachment shanks at the blade room side. And, at least one of the rotation components is the drive component, and it is rotatably attached to the drive component attachment shaft of the attachment shafts so as to be rotated by the energized power of a drive spring at the time of photographing. And, another one of the rotation components is attached to a set component attachment shank of the attachment shanks, wherein when setting is made, resisting the energized power of a return spring, rotation starts from an initial position, and rotates the drive component to a set position while resisting the energized power of the drive spring. If it is constituted such that the set component returns to the initial position by the energized power of the return spring in advance of start of rotation start of the drive component at the time of photographing, an excellent constitution as a usual focal plane shutter for cameras can be obtained.

Furthermore, according to the present invention, the drive component and the set component are made of synthetic resins, and the synthetic resin materials may be almost the same to the synthetic resin materials of the drive component attachment shank and the set component attachment shank. Furthermore, if the synthetic resin material of the attachment shank has almost same co-efficient of expansion of the shutter base plate, or it is made to be a material having lubricity, it becomes effective as an attachment shank of the rotation component energized by a powerful torsion coiled spring. Furthermore, if the shutter base plate and at least one of the attachment shanks, are manufactured by the two color fabrication, productivity is improved and a low cost production can be achieved.

Furthermore, in order to attain the purpose, the a focal plane shutter for cameras according to the present invention, comprises a shutter base plate having an aperture for exposure which is made of synthetic resin, at least one shutter blade in which each end of arms is individually attached rotatably to two or more blade attachment shanks which consist of two or more arms and at least one blade pivoted on these arms, and is installed upright to the shutter base plate, and at least one drive component which is rotatably attached to the drive component attachment shank installed upright to the shutter base plate, and makes opening and closing operation of the aperture by the shutter blade by swinging of one of the arms, wherein at least one attachment shank of the two or more attachment shanks which is installed upright to the shutter base plate in order to attach a rotation component including the blade attachment shank is made of the synthetic resin, and at the part which is fitted into the rotation component, a long groove for sump is formed in the axial direction in the circumferential side surface of it.

According to the present invention, it may be constituted such that, at least one of attachment shanks is the drive component attachment shank. In that case, it may be constituted such that, the part fitted into the drive component consists of the two or more parts in which a diameter of the tip side is formed so that it may become small rather than that of the shutter base plate side, and the groove for the sump is formed at each of the two or more parts. Furthermore, at least one of attachment shanks may be the blade attachment component attachment shank.

Furthermore, the drive component is constituted such that it is rotated by the energized power of a drive spring when photographing is carried out, and a set component attachment shank for attaching a set component so as to enable to be rotated is installed upright on the shutter base plate, and when setting is made, the set component starts to rotate from an initial position, resisting the energized power of a return spring, and then rotates the drive component to the set position while resisting the energized power of the drive spring, and at the time of photographing, returns to the initial position by the energized power of the return spring in advance of start of rotation start of the drive component. Here, at least one of attachment shanks may be the set component attachment shank. In this case, as for the set component attachment shank, its part fitted into the set component consists of the two or more parts in which a diameter of the tip side is formed so that it may become small rather than that of the shutter base plate side, and the groove for the sump may be formed at each of the two or more parts.

When two or more grooves for the sump are formed at predetermined angle interval positions of the attachment shanks, and are formed such that the attachment shank is cut perpendicularly to the axial direction, it becomes optimal if it is formed so that a cross section may become V letter shape.

According to the present invention, in focal plane shutters for cameras in which an attachment shank for attaching a rotation component is installed upright to a shutter base plate made of a synthetic resin, the attachment shank is formed after the shutter base plate was fabricated using the synthetic resin material. Therefore, even if a portion over the front side and back side of large area around a position where a attachment shank is installed upright in the shutter base plate is not formed to be thick especially, as it has been done conventionally, the attachment shank is not inclined or destroyed by an external force after manufacture. Therefore, there is an advantage that it can be made thin.

According to the present invention, when the attachment shank which is installed upright to the shutter base plate and attaches a rotation component is made of the synthetic resin material, a long groove for sump of lubricant is formed along the axial direction of the shank on a circumferential side surface of the attachment shank, the manufacture by low cost can be achieved. Accordingly, It becomes possible to enable suitable rotation of the rotation component and to achieve the improvement in durability.

These and other objects as well as the features and advantages of the present invention will become apparent from the following detailed description of the preferred embodiments when taken in conjunction with the accompanying drawings.

BRIEF DESCRIPTION OF THE PREFERRED EMBODIMENTS

DETAILED DESCRIPTION OF THE PREFERRED EMBODIMENTS

Hereafter, an embodiment of the present invention will be explained with reference to drawings. As mentioned above, the present invention can be applied to a focal plane shutter equipped with two shutter blades, and also to a focal plane shutter equipped with one shutter blade. However, in the embodiment, explanation will be made to examples applied to the focal plane shutter equipped with two shutter blades. The focal plane shutter equipped with two shutter blades can be used for a silver halide film camera and a digital camera as mentioned above. However, in the embodiment, explanation will be made on the assumption that it is used for a digital camera.

Figure 1:
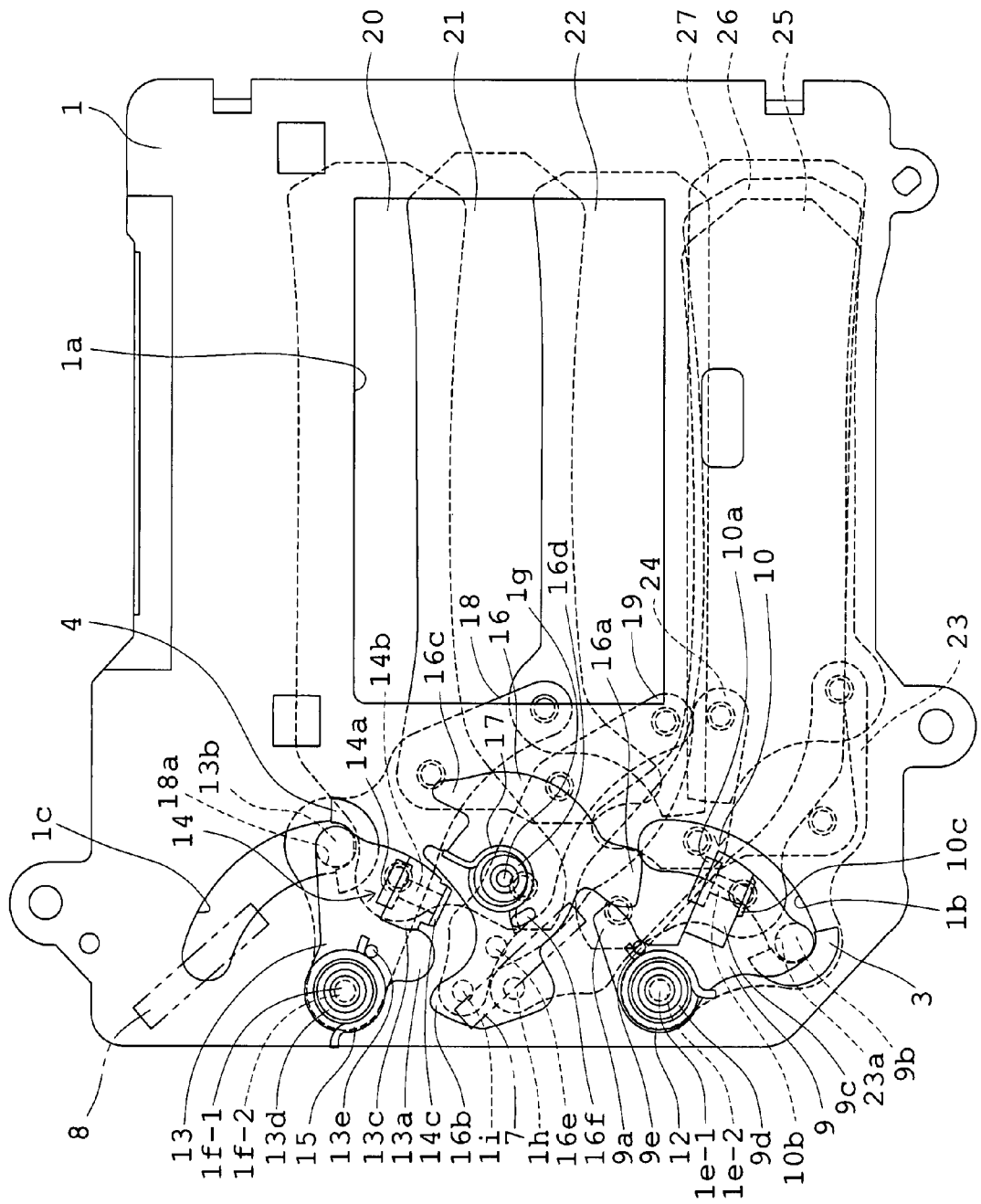
FIG. 1 is a plan view of one of embodiments of the present invention, in a state immediately after completing an exposure operation viewed from the taking-lens side.
Figure 2:
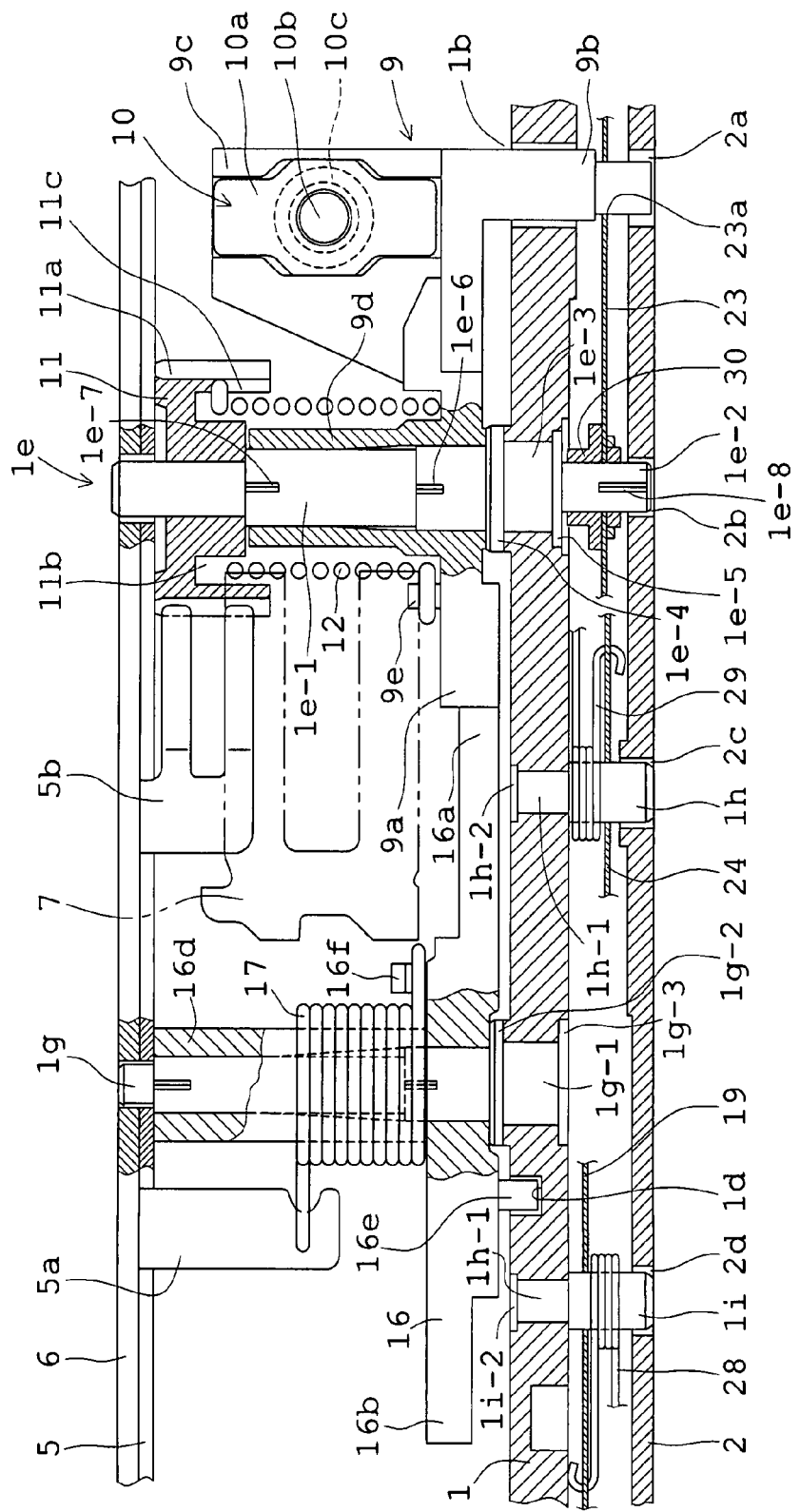
FIG. 2 is a sectional view of the principal part of FIG. 1 for understanding it easily.
Figure 3:
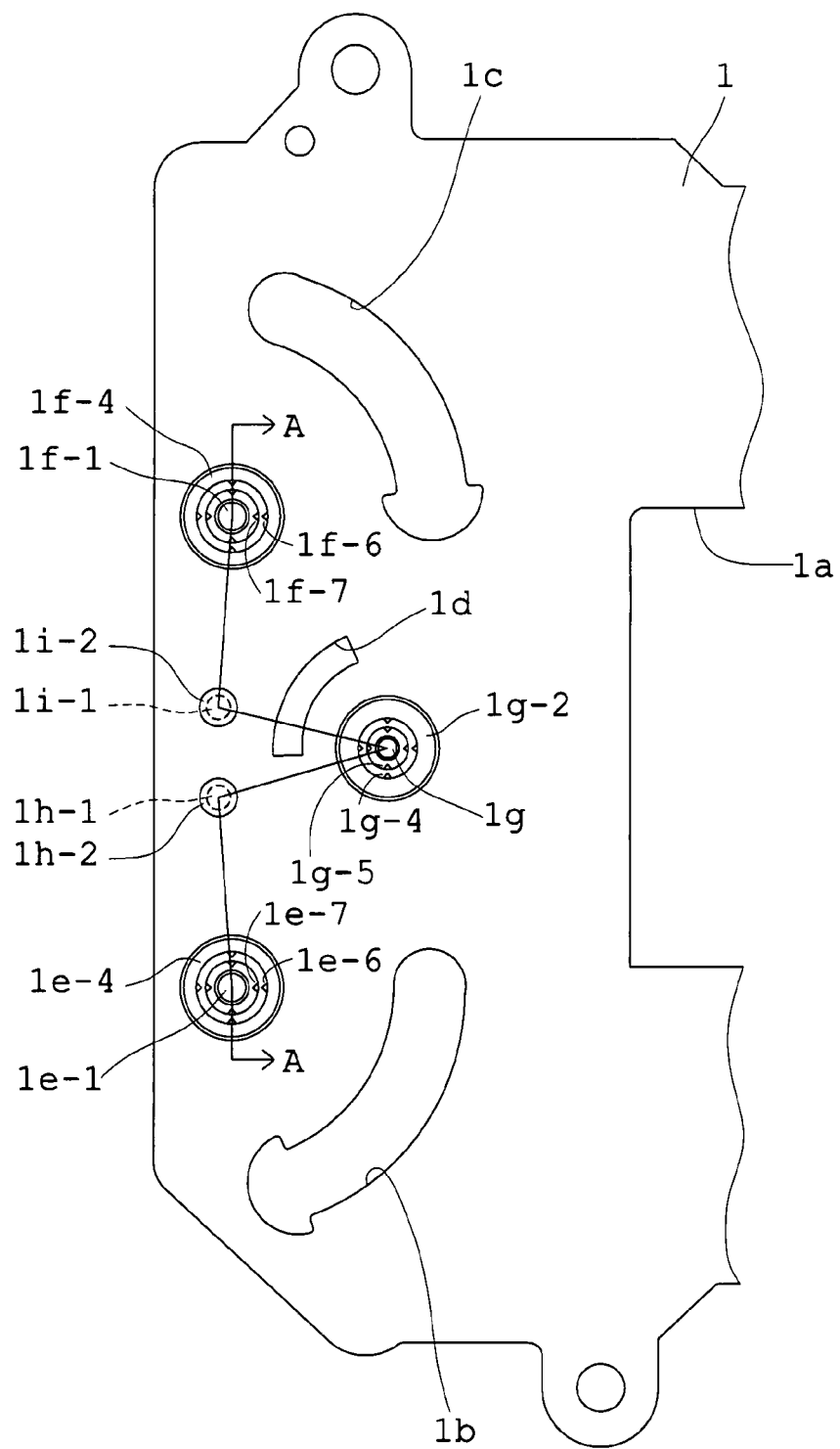
FIG. 3 is a plan view showing a part of shutter base plate of the embodiment of FIG. 1.
Figure 4:
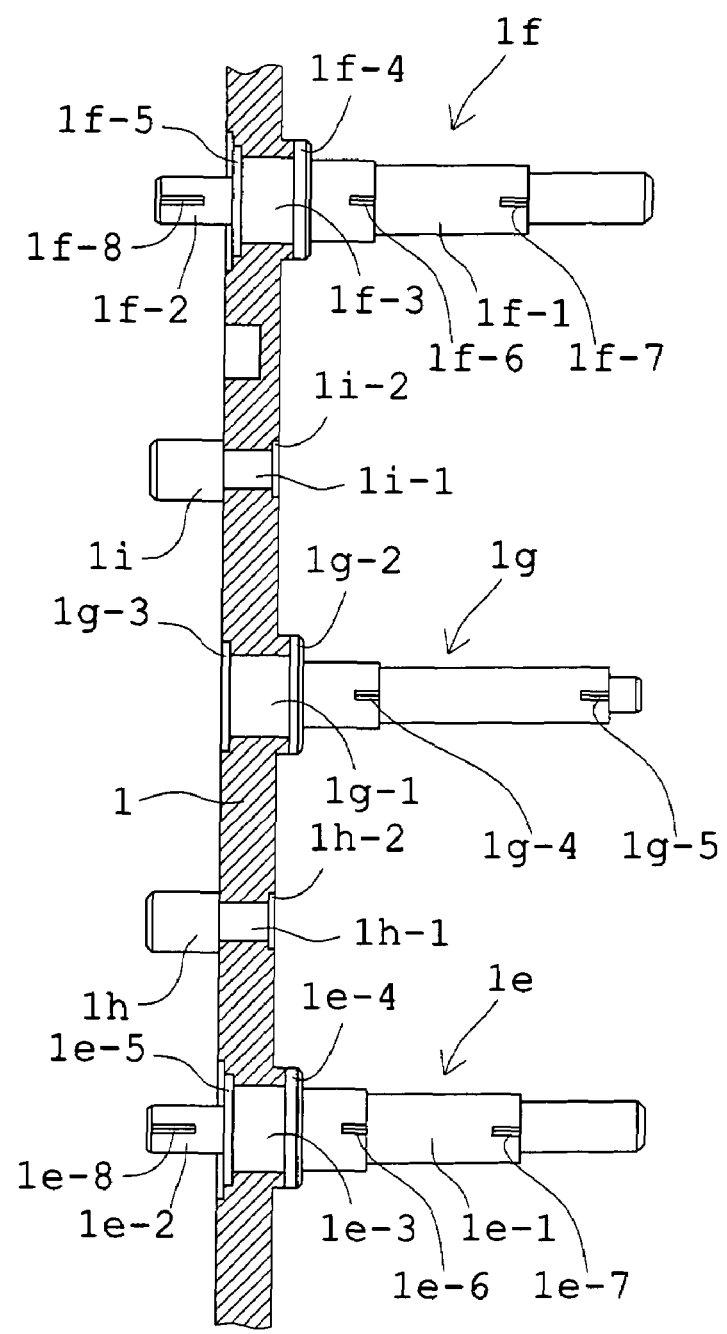
FIG. 4 is a sectional view along A-A' of FIG. 3.
Figure 5:
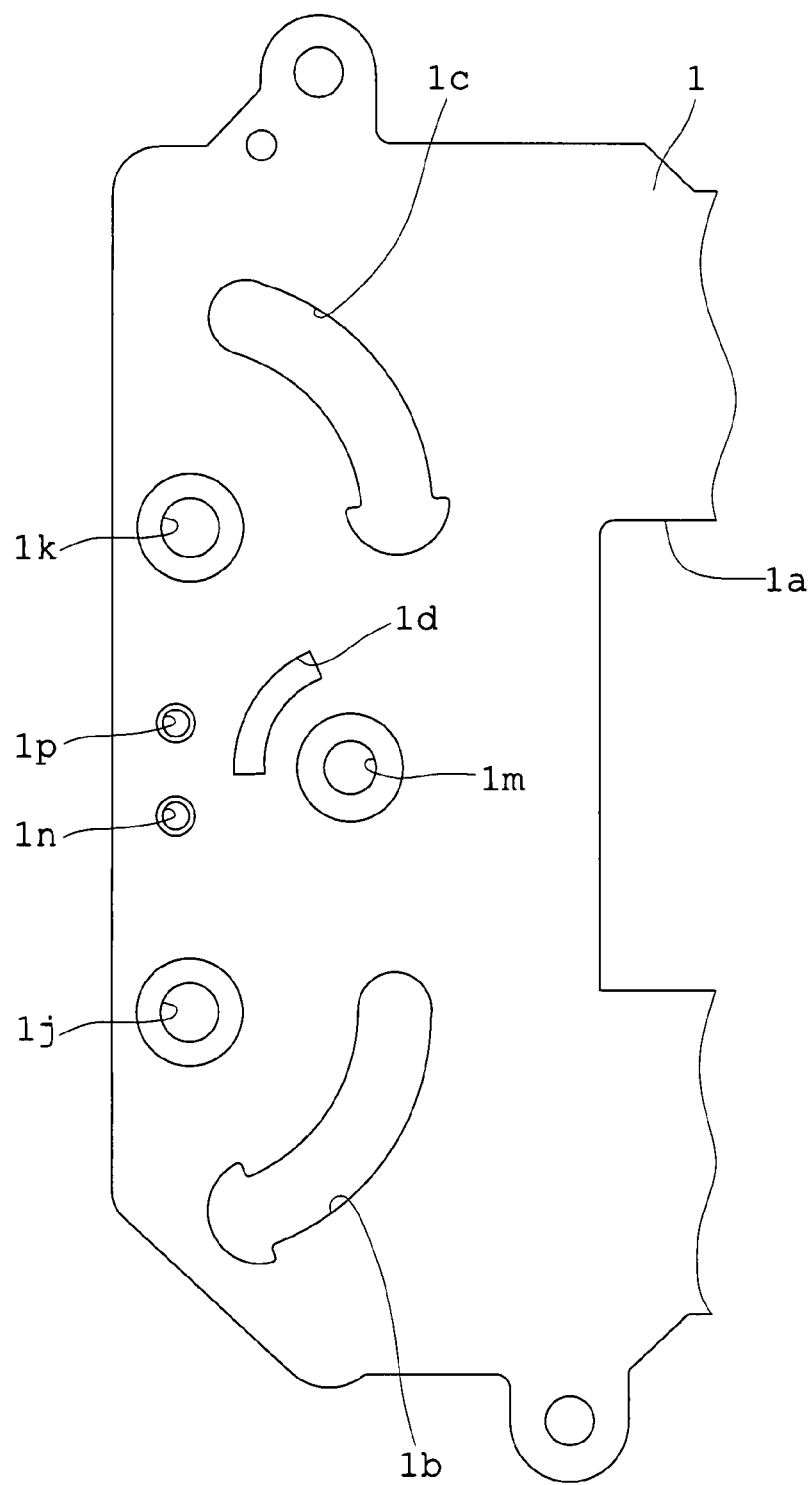
FIG. 5 is a plan view of shutter base plates shown in FIGS. 3 and 4 under manufacturing.
Figure 6:
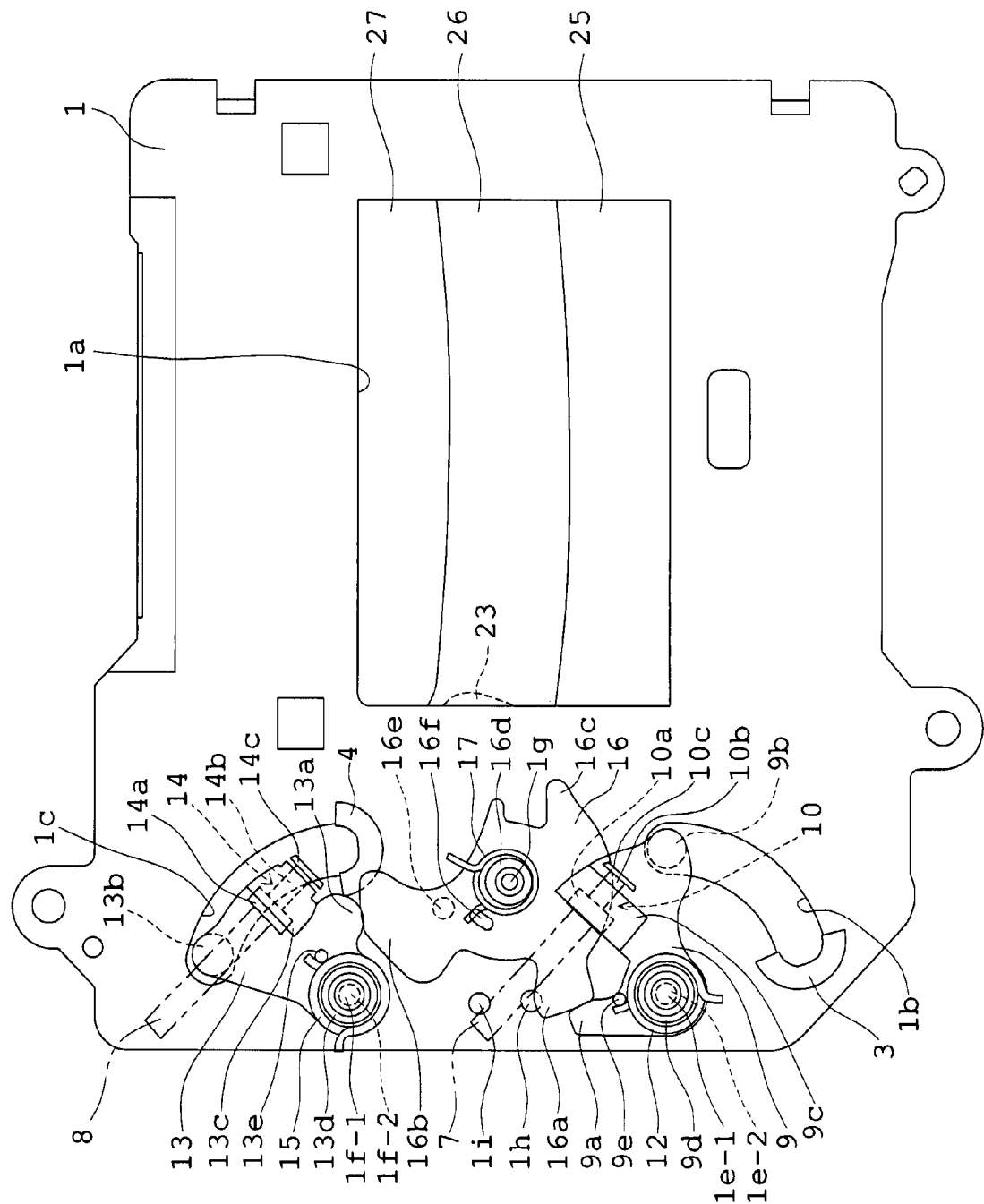
FIG. 6 is a plan view of the embodiment shown in FIG. 1, which is in a set state.
Figure 7:
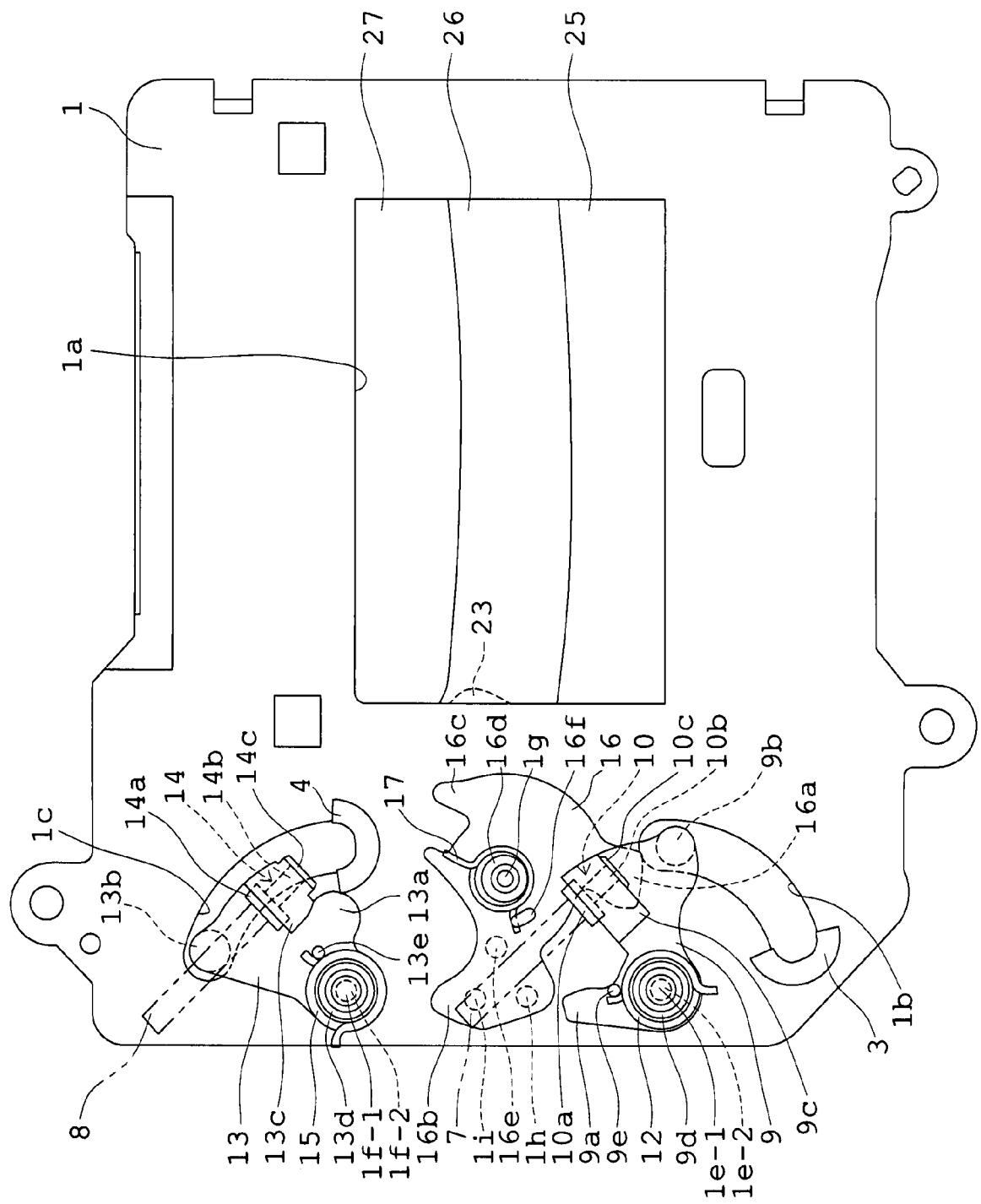
FIG. 7 is a plan view of the embodiment shown in FIG. 1 which is in a state just before start off an exposure operation.
Figure 8A:
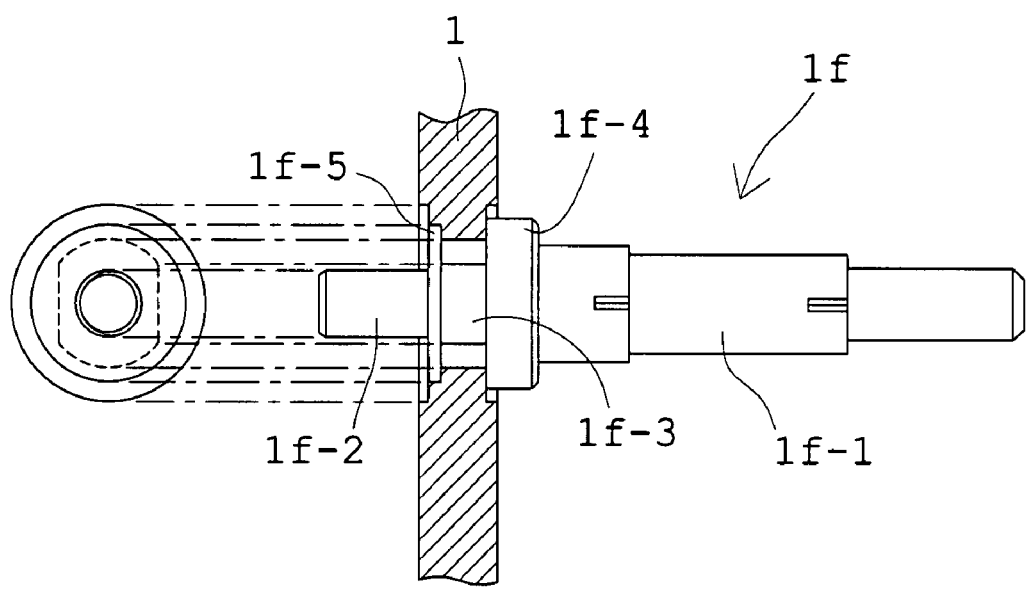
FIGS. 8A and 8B are sectional drawings showing modifications in which implant structures of the attachment shank shown in FIG. 4 differ respectively.
Figure 8B:
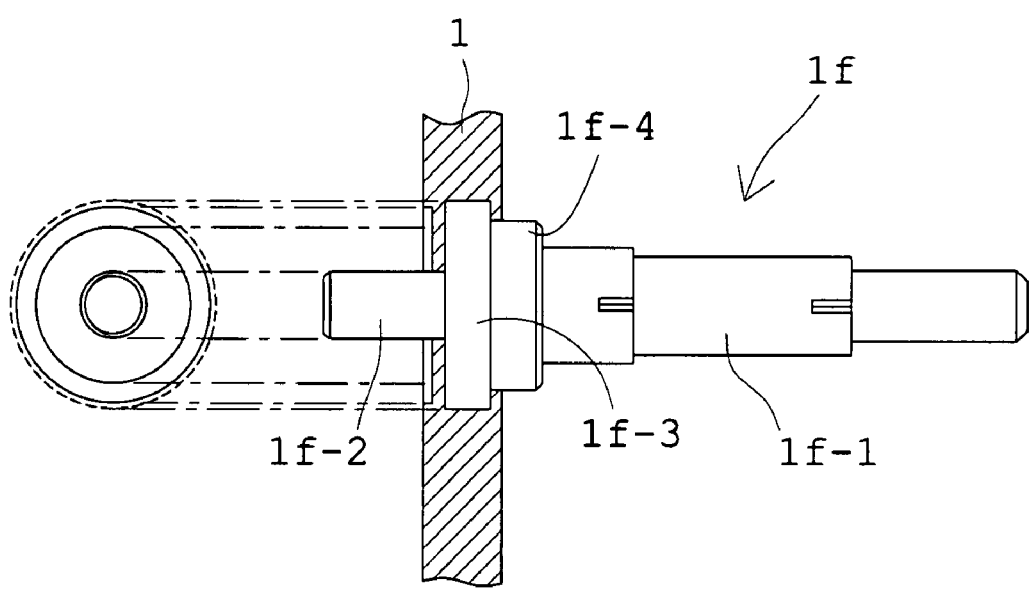

FIG. 1 is a plan view of a state just after completing an exposure operation viewed from the taking-lens side. FIG. 2 is a sectional view of the principal part of FIG. 1 for understanding it easily. FIG. 3 is a plan view showing a part of shutter base plate. FIG. 4 is a sectional view along A-A' of FIG. 3. FIG. 5 is a plan view of shutter base plates shown in FIGS. 3 and 4 under manufacturing. FIG. 6 is a plan view showing the set state. FIG. 7 is a plan view of a state just before start of the exposure-operation. FIGS. 8A and 8B are sectional drawings showing modifications of the embodiment in which the implant structures of the attachment shank 1*f* shown in FIG. 4 differ respectively.

First, the constitution of the present embodiment will be explained using FIGS. 1~5. A shutter base plate 1 is manufactured by using liquid crystal polymer in which glass fiber is mixed, as synthetic resin material, and it has an aperture 1*a* having an elongated rectangle-like shape at about central portion as shown in FIG. 1 for an optical path of photographic subject. At a backside of the shutter base plate 1, namely, at a side of a solid state image pickup device, a middle plate (not illustrated) and an auxiliary base plate 2 (refer to FIG. 2) attached in order and at a predetermined interval, and a blade room for a second blade is constituted between the shutter base plate 1 and the middle plate, and a blade room for a first blade is constituted between the middle plate and the auxiliary base plate. The size of the middle plate and the auxiliary base plate are almost the same to that of the shutter base plate 1, as well known, and at the almost central portion of it, an aperture having almost the same size is formed overlapping with the aperture 1*a*. However, in the present embodiment, the aperture 1*a* is an exposure aperture.

In FIG. 1, two long pores 1*b* and 1*c* having circular arc shape are formed in a domain on the left-hand side of the exposure aperture 1*a* in the shutter base plate 1. At ends of lower parts of these pores, well known buffer components 3 and 4 which are made of rubber and have C letter-like shape in plane are attached. Also, on an auxiliary base plate 2, long pores having a similar shape are formed on places which overlap with the long pores 1*b* and 1*c*. However, in FIG. 2, only a long pore 2*a* formed so as to overlap with the long pore 1*b* is shown by the section. On the shutter base plate 1, a long pore 1*d* having a circular arc shape smaller than that of these are formed. (refer to FIG. 3) on the domain between the long pores 1*b* and 1*c*. As shown in FIG. 2, the long pore 1*d* does not penetrate the shutter base plate 1. With respect to the long pore 1*d*, the illustration is omitted in FIG. 1, FIG. 6, and FIG. 7.

As shown in FIG. 4 at the shutter base plate 1, attachment shanks 1*e* and 1*f* using liquid crystal polymer in which glass fiber is mixed, as synthetic resin material, are installed upright over both sides of the shutter base plate 1, and shank parts 1*e*-1 and 1*f*-1 at the side of the taking lens are used as shanks for attaching the drive components, and shank parts 1*e*-2 and 1*f*-2 at the side of the blade room are used as shanks for attaching the blades. Tips of shank parts 1*e*-2 and 1*f*-2 at the side of the blade room are inserted loosely into the pore formed in the auxiliary base plate 2. However, in FIG. 2, only the pore 2*b* in which the tip of shank part 1*e*-2 of the attachment shank 1*e* is inserted is shown by the section. Like the attachment shanks 1*e* and 1*f*, also the set component attachment shank 1*g* which is manufactured by using the liquid crystal polymer is installed upright on the shutter base plate 1 at the taking-lens side, In the present embodiment, on the attachment shanks 1*e*, 1*f*, and 1*g*, two set of flange parts 1*e*-4, 1*e*-5, 1*f*-4, 1*f*-5, 1*g*-2, and 1*g*-3 are formed between which shank parts 1*e*-3 or 1*f*-3, 1*g*-1 are formed. Since the shutter base plate 1 is disposed between them, the attachment shanks 1*e*, 1*f*, and 1*g* can be installed upright in more stable state. Especially, even when the degree of adhesion between the shanks and the shutter base plates 1 is small, an attachment strength in the direction of the shanks is obtained suitably. Moreover, flange parts 1*e*-4, 1*f*-4 and 1*g*-2 are located at vicinity of a base part which is formed so as to be projected from the shutter base plate 1. However, if it is necessary to narrow the interval between the shutter base plate 1 and a supporting plate 5 mentioned later, it is not necessary to form such base part.

As shown in FIG. 4, shank parts 1*e*-1 and 1*f*-1 of attachment shanks 1*e* and 1*f*, and attachment shank 1*g* of the set component, have a large diameter part, a medium diameter part, and a small diameter part respectively. Among those, the large diameter part and the medium diameter part which are formed in the shank part 1*e*-1 of the attachment shank 1*e* are parts which are fitted into a drive component 9 for the first blade mentioned later. Grooves 1*e*-6 and 1*e*-7 for sump are formed, along the direction of the axis of the shank, in the shape of a long straight line on the circumferential side surfaces of them. The grooves 1*e*-6 and 1*e*-7 for sump, as shown in FIG. 3, are formed on the circumferential side surface of the large diameter part and the medium size diameter part at interval of 90 degrees, and by four on each of the side surface. When these are cut perpendicularly to the direction of axis of the attachment shank 1*e*, these are formed so that it may become V letter shape having its section open to the radial direction. At the time of assembly, lubricant is applied to the grooves. Then, it enters into the drive components 9 for the first blade in accompanying with rotation of the drive component 9 for the first blade. Therefore, it is constituted such that an appropriate rotation of the drive component 9 for the first blade can be obtained, and improvement in durability can be achieved.

The large diameter part and the medium diameter part which are formed in the shank part 1*f*-1 and the set component attachment shank 1*g* are parts which are fitted into a drive component 13 for the second blade and the set component 16 respectively, as mentioned later, and in the same purpose as mentioned above, four grooves for sump 1*f*-6, 1*f*-7, 1*g*-4, and 1*g*-5 which have the same shape are formed at every interval of angle of 90 degrees. Furthermore, since the shank part 1*e*-2 of the attachment shank 1*e* is a part which is fitted into a reinforcement component 30 (refer to FIG. 2) attached to an arm 23 as mentioned later, similarly, four grooves 1*e*-8 having the same cross-sectional forms as mentioned above are formed on the circumferential side surface at the interval of angle of 90 degrees. Similarly, the shank part 1*f*-2 of the attachment shank 1*f* is a part which is fitted into the reinforcement component which is not illustrated, and attached to an arm 18 mentioned later, and four grooves 1*f*-8 having the same cross-sectional shape in the circumferential side surface are formed at the interval of angle of 90 degrees.

Furthermore, on a surface at the side of the blade room of the shutter base plate 1, the blade attachment shanks 1*h* and 1*i* (refer to FIGS. 2~4) which are manufactured by using the liquid crystal polymer as synthetic resin material are installed upright, and as shown in FIG. 2, the tips are loosely inserted in the pores 2*c* and 2*d* of the auxiliary base plate 2. In case of the present embodiment, the attachment shanks 1*e* and 1*f*, the set component attachment shank 1*g*, and the blade attachment shank 1*h* and 1*i* are installed upright to the shutter base plate 1 by two colors molding method. The blade attachment shanks 1*h* and 1*i* in the present embodiment, the shank parts 1*h*-1 and 1*i*-1 which are installed upright to the shutter base plate 1 are formed thin, and on each end of them, each of flange parts 1*h*-2 and 1*i*-2 is formed and the flange parts 1*h*-2 and 1*i*-2 are disposed to sandwich the shutter base plate 1 together with the shank part which is attached to the arms 19 and 24 as mentioned later. However, the two flange parts may be formed like the attachment shanks 1*e*, 1*f*, and 1*g*, and by these the shutter base plate 1 may be sandwiched.

Besides those, at least two shanks(not illustrated) are installed upright to the surface at the side of the taking lens of the shutter base plate 1. At ends of these shanks, as well known, a supporting plate 5 and a printed wiring board 6 shown only in FIG. 2 are attached in piles, and in the pore formed in them, the small diameter parts of the attachment shanks 1*e* and 1*f*, and the set component attachment shank 1*g* are loosely inserted. Furthermore, an electromagnet for the first blade and an electromagnet for the second blade are attached at the side of the shutter base plate 1 of the supporting plate 5. However, as those constitutions have been well known, in FIG. 1 iron core components 7 and 8 only are shown by two-dot chain lines, and also in FIG. 2, the iron core component 7 of the electromagnet for the blade is shown by the two-dot chain lines. Furthermore, two ratchet nails which have one spring part and flexibility are formed in the supporting plate 5 by bending the part of it as well known. However, in FIG. 2, the spring part 5*a* and one of the ratchet nails 5*b* are shown.

The drive component 9 for the first blade made of synthetic resin is rotatably attached to the shank part 1*e*-1 of the attachment shank 1*e*. This drive component 9 for the first blade has a part 9*a* which is moved by pressing, a drive pin 9*b*, an attachment part 9*c*, and a cylindrical part 9*d* and a spring part 9*e*, wherein the cylindrical part 9*d* is fitted into to the large diameter part and medium diameter part of the shank part 1*e*-1. Moreover, the drive pin 9*b* penetrates the long pore 1*b* of the shutter base plate 1, and projects into the blade room, and the tip of it is inserted in the long pore 2*a* of the auxiliary base plate 2. Furthermore, as shown in FIG. 2, the attachment 9*c* is formed so as to have an upheaved form at the supporting-plate 5 side, and an iron piece component 10 is attached to inside of it. The iron piece component 10 consists of an iron piece part 10*a* which is attracted by the iron core component 7, a shank part 10*b*, and a head 10*c* having a flange-like shape, and as well known, it is elastically compressed so that the iron piece part 10*a* may be projected from the attachment 9*c* by a spring arranged at inside which is not illustrated. FIG. 1 shows a state that a head 10*c* touches an edge at the opposite side of the attachment 9*c* by elastic compression.

As shown in FIG. 2, although illustration is omitted in FIG. 1, a ratchet wheel as well known is attached so as to enable to be rotated to the small diameter part of the shank part 1e-1 of the attachment shank 1e. On a peripheral side surface of the ratchet wheel 11A, a ratchet gear tooth 11a is formed, where the ratchet nail 5b is engaged. Furthermore, in this ratchet wheel 11 an annular groove 11b is formed, and a spring hook part having slit like shape 11c is formed on a part of peripheral part. In the cylindrical part 9d of the drive component 9 for the first blade, a drive spring 12 for the first blade having a powerful elastic compression is inserted loosely. The drive spring 12 for the first blade, in FIG. 1, applies an elastic compression power so that the drive component 9 for the first blade may be rotated to clockwise direction by hooking one end of the drive spring on the spring hook part 9e of the drive component 9 for the first blade, and by hooking the other end on the spring hook part 11c from the side of the groove 11b of the ratchet wheel 11. The elastic compression power of the drive spring 12 for the first blade can be adjusted by rotating the ratchet wheel 11 and changing an engagement-position of the ratchet gear tooth 11a and the ratchet nail 5b at the time of manufacture.

The drive component 13 for the second blade made of synthetic resin is rotatably attached to the shank part 1f-1 of the attachment shank 1f. The drive component 13 for the second blade has a part 13a which is moved by pressing, a drive pin 13b, an attachment 13c, a cylindrical part 13d and a spring hook part 13e. And the cylindrical part 13d is fitted into the large diameter part and medium diameter part of the shank part 1f-1. The drive pin 13b penetrates the long pore 1c of the shutter base plate 1, and projects into the blade room, and the tip pf it is inserted into the long pore of the auxiliary base plate 2 that is not illustrated. Furthermore, like the attachment 9c, the attachment 13c is formed to have an upheaved portion at the side of the supporting plate 5, and an iron piece component 14 is attached to inside of it. The iron piece component 14 consists of an iron piece part 14a which is attracted by the iron core component 8, a shank part 14b, and a head 14c having a flange-like shape. And like the case of the iron piece component 10, it is elastically pressed so that the iron piece part 14a may project from the attachment 13c by the spring which is placed inside but it is not illustrated, Although not illustrated, a ratchet wheel having the same shape as the ratchet wheel 11 is retractably attached to the small diameter part of the shank part 1f-1 of the attachment shank 1f. And, a ratchet nail which is arranged at the supporting plate 5 but not illustrated is engaged to the ratchet gear tooth of the ratchet wheel. Like the case of the drive spring 12 for the first blade, the drive spring 15 for the second blade is fitted loosely into the cylindrical part 13d of the drive component 13 for the second blade, and elastically presses the drive component 13 for the second blade so as to be rotated to a clockwise rotation by hooking one end of the drive spring on the spring hook part 13e of the drive component 13 for the first blade, and hooking the other end on the spring hook part which is not illustrated. in FIG. 1. And, the energized power of the drive spring 15 for the second blade can also be adjusted now by rotating the ratchet wheel.

The set component 16 is rotatably attached to the set component attachment shank 1g. The set component 16 has pushing parts 16a and 16b to actuate moving, a part 16c which is moved by pressing, a cylindrical part 16d, a pin 16e, and a spring hook part 16f. And the cylindrical part 16d is fitted into the large diameter part and the medium diameter part of the set part attachment shank 1g. Furthermore, when an operation for setting is carried out, the pushing part 16a pushes the part 9a which is moved by pressing of the drive component 9 for the first blade, and the pushing part 16b pushes the part 13a which is moved by pressing 13a of the drive component 13 for the second blade, and the pin 16e arranged at the side of the shutter base plate 1 is inserted into the long pore 1d. Furthermore, in the cylindrical part 16d of the set component 16, the return spring 17 is fitted loosely. As shown in FIG. 2, the return spring 17, the return spring 17 elastically presses so that the set component 16 may be rotated to counterclockwise direction by hooking one end of the return spring on the spring hook part 16f of the set component 16, and by hooking the other end of it on the spring hook part 5a of the support component 5 in FIG. 1.

As explained above, in the blade room between the shutter base plate 1 and the middle plate which is not illustrated, the second blade is arranged, and the first blade is arranged at the blade room between the middle plate and the auxiliary base plate 2. The first blade and the second blade are constituted as well known. That is, as shown in FIG. 1, the second blade is constituted with two arms 18 and 19, only a part of which is shown in FIG. 1, and three blades 20, 21, and 22 which are pivoted in order toward length directions of them. As for the arm 18 which is at upper side in FIG. 1, an end of it is rotatably attached to the shank part 1f of the attachment shank 1f-2, and the arm 19 which is at under side in FIG. 1 is rotatably attached to the blade attachment shank 1i as shown also in FIG. 2. Moreover, a pore which is not illustrated is formed in the arm 18, and the drive pin 13b is fitted into there. Therefore, in FIG. 1, when the drive component 13 for the second blade is rotated to counterclockwise direction, also the arm 18 is rotated to counterclockwise direction, and three blades 20, 21, and 22 are made to be overlapped. Then, when the drive component 13 for the second blade is rotated to clockwise direction, the arm 18 is also rotated to clockwise direction and three blades 20, 21, and 22 are developed. The arm 18 attaches, at its end, a reinforcement component which is the same to reinforcement component 30 of an arm 23 mentioned later.

On the other hand, the first blade consists of two arms 23 and 24 and three blades 25, 26, and 27 which are pivoted in order of the length direction as same as seen in the second blade, and it is arranged at the blade room in a state such that the second blade is turned over. Therefore, in FIG. 6, the two arms 23 and 24 cannot be seen as they are behind the blades 25, 26, and 27. However, as for the arm 23 which is at underside in FIG. 1 as shown in FIG. 2, an end of it is rotatably attached to a shank part 1e-2 of the attachment shank 1e via the reinforcement component 30, and the arm 24 which is at upside in FIG. 1 is rotatably attached to the blade attachment shank 1h as shown also in FIG. 2. The pore 23a is formed in the arm 23, and the drive pin 9b is fitted into it. Therefore, in FIG. 1, when the drive component 9 for the first blade is rotated to counterclockwise direction, the arm 23 is also rotated to counterclockwise direction and three blades 25, 26, and 27 are developed. Then, when the drive component 9 for the first blade is rotated to clockwise direction, the arm 23 is also rotated to clockwise direction and three blades 25, 26, and 27 are overlapped.

On the arms 19 and 24 as shown in FIG. 2, well known play-controlling-springs 28 and 29 for securing proper play which are fitted into the blade attachment shanks 1i and 1h, and have elastic power weaker than those of the drive springs 15 and 12 are hooked. These play-preventing-springs 28 and 29 are hooked on the spring hook part (not illustrated) in which each end is arranged by the shutter base plate 1, and the other end is hooked on the arms 19 and 24. In FIG. 1, these are pressing by the springs so that the arms 19 and 24 may be rotated to counterclockwise direction. As shown in FIG. 2, in the attachment of the arm 23 of the first blade to the shank part 1e-2 in order to prevent from totter and breakage of the arm 23, and in order to be able to maintain suitably an interval with the shutter base plate 1 and the auxiliary base plate 2, a reinforcement component 30 is fixed by caulking processing, and also on the arm 18 of the second blade, a reinforcement component having almost same shape is attached. In fact, usually a reinforcement component having similar form is attached to the arms 19 and 24, although it is not attached in the present embodiment. When it is constituted in such way mentioned above, it is desired that also to the blade attachment shanks 1i and 1h, grooves for sump are formed as same to the case of the shank parts 1f-2, and 1e-2, and lubricant is applied.

Next, the operation of the present embodiment will be explained. FIG. 1 shows a state just after an exposure operation has been completed. Therefore, in this state, the drive component 9 for the first blade is in the stop state such that the drive pin 9b is contacted to the buffer component 3, and three blades 25-27 of the first blade are in the overlapped state where the amount of overlap of the blades has become maximum, and they are stored in a lower part position of the aperture part 1a. On the other hand, the drive component 13 for the second blade is in the stop state such that the drive pin 13b is contacted to the buffer component 4, and three blades 20~22 for the second blade are in the developed state and covers the aperture part 1a, where an amount of overlap of the blades has become minimum. Furthermore, the set component 16 is in an stop state which the pin 16e is touched to a lower end of the long pore 1d. Hereafter, with respect to the set component 16, this position is called the initial position.

Then, the set operation performed from this state will be explained first. When the last photographing is completed, a component at the side of the main part of a camera which is not illustrated pushes the part 16c which is moved by pressing of the set component 16, and rotates the set component 16 to clockwise direction resisting an elastic compression power of the return spring 17. By this action, firstly, the pushing part of the set component 16 pushes the part 9a which is moved by pressing of the drive component 9 for the first blade. And by this action, the set component 16 begins to rotate the drive component 9 for the first blades to counterclockwise direction, while resisting the elastic compression power of the drive spring 12 for the first blades. After this action, when the blade 27 which is a slit blade of the first blade is overlapped with the blade 22 which is a slit blade of a the second blade by a predetermined amount, the pushing part 16b of the set component 16 pushes the part 13a which is moved by pressing of the drive component 13 for the second blade, and by this action the set component 16 begins to rotate the drive component 13 for the second blades to counterclockwise direction, while resisting the elastic compression power of the drive spring 15 for the second blades. Therefore, three blades 25~27 of the first blade operate upwards, making an amount of overlap of the blades each other small, and three blades 20~22 of the second blade operate upwards, enlarging an amount of overlap of the blades each other.

During such set operation mentioned above, since as for the springs 12, 15, and 17 which are fitted into the set component 16, a centerline of its rolling shaft is twisted as they become tense, power generated by the twist acts so that it may push a part of inner peripheral surface of cylindrical parts 9d, 13d, and 16d to the shank part 1e-1, the shank part 1f-1 and the set component attachment shank 1g, toward the radial direction. However, in the present embodiment, friction is appropriately reduced by the lubricant oozed out from each of the grooves for sump 1e-6, 1e-7 1f-6, 1f-7, 1g-4 and 1g-5, and accordingly each of drive components 9 and 13 and the set component 16 are rotated appropriately.

While the set operation is performed in this way, when three blades 25~27 of the first blade cover the aperture 1a, and the three blades 20~22 of the second blade are retreated to the upper part position of the aperture 1a, the iron piece parts 10a and 14a of the iron piece components 10 and 14 attached to each of drive components 9 and 13 touch the iron core components 7 and 8 of the electromagnet for the first blade and the electromagnet for the second blade. However, even after that, the set component 16 is rotated slightly, and the iron piece parts 10a and 14a of the iron piece components 10 and 14 are pushed into the attachment part 9c, and 13c of each of the drive components 9 and 13, while resisting against elastic compression power of a spring which is not illustrated, and when the heads 10c and 14c of the iron piece components 10 and 14 become to a state where the heads are separated from the attachment parts 9c and 13c, the set component is stopped. The stop state mentioned above is a set state shown in FIG. 6.

In photographing, when a release button is pushed, firstly, each of the electromagnets which are not illustrated is electrified, and each of the iron core component 7 and 8 attracts and holds the iron piece components 10 and 14. After that, since the elastic compression power by the component at the side of the main part of a camera (not illustrated) to the part to be moved by pressing 16c of the set component 16 is released, and the lubricant is applied between the set component attachment shank 1g and the set component 16, it is quickly rotated by the elastic compression power of the return spring 17 from the set position to counterclockwise direction. In the initial stage, since the thrust force to the parts 9a and 13a which is to be moved by pressing of each of drive components 9 and 13 by the moving by pushing parts 16a and 16b of the set component 16 is released, each of drive components 9 and 13, by the elastic compression power of each of drive springs 12 and 15, are rotated until those attachments 9c and 13c touch the heads 10c and 14c of the iron piece components 10 and 14, and then stop. As well known, at this time, the drive pins 9b and 13b rotate the arms 23 and 18, the play controlling springs 28 and 29 are strained a little, and the slit blades 27 and 22 of the first blade and the second blade are made set at a predetermined exposure-operation starting position. The state where the set component 16 has returned to the initial position is the state shown in FIG. 7.

Then, when electrifying to two electromagnets is canceled according to the time interval determined by the exposure controlling circuit, lubricant is applied between shank parts 1e-1 and 1f-1 of the drive component 9 for the first blade and the drive component 13 for the second blade. Since lubricant has been applied between the reinforcement component and shank parts 1e-2 and 1f-2 which are attached to each of arms 23 and 18 of the first blade and the second blade, those are quickly rotated to clockwise direction by each of drive springs 12 and 15 which have a powerful elastic compression power for pressing, and by the slit formed between the slit blade 27 of the first blade and the slit blade 22 of the second blade, the image pick-up surface of the solid state image pickup device becomes exposed.

In this case, firstly, when electrifying to the electromagnet for the first blades is stopped, power of attracting of the iron core component 7 to the iron piece part 10a of the iron piece component 10 is lost, and the drive component 9 for the first blades is quickly rotated by the elastic compression power of the drive spring 12 for the first blades to clockwise direction, straining the play controlling spring 29. Therefore, three blades 25~27 of the first blade operate enlarging an overlap of the blades each other, and become to open the aperture 1a from an upper domain. Just after the aperture 1a is fully opened, the drive pin 9b of the drive component 9 for the first blade touches the buffer component 3, and thereby the operation of the drive component 9 for the first blade and the first blade are stopped, and three blades 25~27 of the first blade are overlapped and stored in the lower part position of the aperture 1a.

When electrifying to the electromagnet for the second blade is stopped after electrifying to the electromagnet for the first blades was stopped as mentioned above, and a predetermined time has been elapsed, the power of attracting of the iron core component 8 to the iron piece part 14a of the iron piece component 14 is lost, and the drive component 13 for the second blade is quickly rotated by the elastic compression power of the drive spring 15 for the second blade to clockwise direction, straining the play controlling spring 28. Therefore, three blades 20~22 of the second blade operate so as to make an amount of overlapping of the blades each other small, and close the aperture 1a from the upper domain. And, just after the three blades 20~22 of the second blade close the aperture 1a completely, the drive pin 13b of the drive component 13 for the second blade touches to the buffer component 4, and thereby the operation of the drive component 13 for the second blade and the second blade are stopped. The state shown in FIG. 1 is a state such that after the operation mentioned above, transmitting of the image pick-up information to a storage apparatus from a solid state image pickup device has been completed.

Here, a manufacture method of the shutter base plate 1 and the shanks 1e, 1f, 1g, 1h, and 1i which are installed upright there according to this embodiment will be explained. In the present embodiment, small diameter parts of the shanks 1e, 1f, and 1g, are fitted loosely into by an amount of erection tolerance, although it is slightly small to the pores formed in the supporting plate 5 and the printed wiring board 6. Moreover, each of the drive springs 12 and 15 and the return spring 17 are torsion coiled springs, and are fitted into loosely to the cylindrical parts 9d, 13d, and 16d of each of the drive components 9 and 13 and the set component 16 in order to prevent from slidingly contacting with those peripheral surfaces, and one end of each of the drive springs 12 and 15 is hooked on each of drive components 9 and 13, and the other end is hooked on each of ratchet wheel 11 (as for other ratchet wheel, the illustration is not shown), and one end of the return spring 17 is hooked on the set component 16, and the other end is hooked on the supporting plate 5.

As well known, since those springs 12, 15 and 17 are not only compressing elastically each drive components 9 and 13 and the set component 16 to the rotating direction, but also always compressing elastically the side of the shutter base plate 1, in fact, the centerline of each coil part is spiral. Therefore, each of the drive springs 12 and 15, applies the power of the radial direction to the shank parts 1e-1 and 1f-1 of the attachment shanks 1e and 1f by two drive components 9 and 13 and two ratchet wheels (11 etc.), and applies the power of the radial direction to the set component attachment shanks 1g via the return spring 17 minds the set component 16. As seen from the explanation of the operation, such power to the radial direction, is remarkably enlarged whenever the set operation for winding up each spring is performed, When the set component 16 returns to the initial position and the pin 16e touches the lower end of the long pore 1d, a big power is applied also on the radial direction of the set component attachment shank 1g by that impact, and when the drive pins 9b and 13b touch to the buffer components 3 and 4 at the time of the end of an exposure operation of each of the drive components 9 and 13, while a big power is applied also the radial direction of the shank parts 1e-1 and 1f-1 on the radial direction of the attachment shanks 1e and 1f by that strong impact, a big power is also applied on the radial directions of the shank parts 1e-2 1f-2, the attachment shanks 1h and 1i according to the inertia of each of the shutter blades. Moreover, since the power of the radial direction is applied on the blade attachment shanks 1h and 1i directly by the play controlling springs 28 and 29, the power of those radial directions becomes large at the time of the exposure operation.

Since the power of those strong radial directions is applied repeatedly whenever a photographing is carried out, when the attachment shanks 1e and 1f, the set component attachment shank 1g, etc. are installed upright by the simultaneous integral molding with the shutter base plate 1 like conventional cases, if those shanks are made thin accompanying with miniaturization of a shutter, those shanks become soon inclined or destroyed. Especially, in case that the shank parts 1e-1 and 1f-1 of attachment shanks 1e and 1f, since the drive springs 12 and 15 hooked on each of the drive components 9 and 13 have powerful elastic compression power, such influence received becomes most greatly. However, in case of the present embodiment, there is no such influence. Accordingly, the attachment shanks 1e and 1f, and the set component attachment shank 1g, etc. can be made thinner than those of conventional ones. Then, explanation will be made on issues mentioned above.

In general, when a liquid crystal polymer is molded, since it has strong orientation characteristics that particle chains gather along the flow direction, it has outstanding mobility, and has been used abundantly as a molding compound of a precision component, so far. However, after molding, this material becomes hardened in a state of the orientation when it was mobilized, and accordingly, anisotropy is too large so that it may generate curvature, distortion, etc. in the molded material. Therefore, in order to ease anisotropy, load materials (glass fiber, etc.) have been blended with the liquid crystal polymer. Therefore, the attachment shanks 1e and 1f, the set component attachment shank 1g, etc. of the present embodiment have been conventionally manufactured by the simultaneous integral molding similar to the shutter base plate 1 using materials such as a liquid crystal polymer mixed with glass fiber etc.). When molding is made, the melting material mixed with glass fiber is poured into cavity from a gate, and flows along a cavernous domain used as a plate of the shutter base plate 1, and at a portion where it is a base part such as the attachment shanks 1e and 1f, the component attachment shank 1g and the like, a part of it flows by changing its direction about 90 degrees. Therefore, at the base part of those shanks, the flow direction is disturbed, and it becomes in a state where neither the particle chain at the time of hardening nor the orientation of a glass fiber has lined up. Furthermore, the flow in a die also worsens because the shank becomes thin. Accordingly, no expected intensity can be obtained. Therefore, if strong power is repeatedly applied to radial directions of the attachment shanks 1e and 1f and the set component attachment shank 1g, those shanks become inclined or damaged.

Contrary to it, the attachment shanks 1e and 1f, the set component attachment shank 1g, etc. in the present embodiment are fabricated by using the two color molding with the shutter base plate 1. That is, firstly, the shutter base plate 1 is fabricated by the liquid crystal polymer. At this stage, the shutter base plate 1 has a shape as shown in FIG. 5, and the pores 1j, 1k, 1m, 1n and 1p having a round shape are formed as a penetration hole at the parts where the attachment shanks 1e and 1f, the set component attachment shank 1g, and the blade attachment shanks 1h and 1i are installed upright. Thus, after the shutter base plate 1 was fabricated, the attachment shanks 1*e* and 1*f*, the set component attachment shank 1*g*, and the blade attachment shanks 1*h* and 1*i* are further fabricated by the liquid crystal polymer. FIGS. 3 and 4 show the shutter base plate 1 in a state such that those shanks 1*e*, 1*f*, 1*g*, 1*h*, and 1*i* were installed upright in such way.

Thus, in the present embodiment, the shanks 1*e*, 1*f*, 1*g*, 1*h*, and 1*i* are installed upright to the shutter base plate 1 by using two color molding method. Therefore, in comparison with a case in which the molding was carried out by a conventional way, disturbance of the flow of the melting material does not occur at the time of fabrication, and the particle chain and glass fiber of the liquid crystal polymer are aligned toward the direction of the shank. Therefore, when those shanks are installed upright together with the shutter base plate by the simultaneous integral molding, even if the thickness is made thin so that is may generate an inclination or damage of the shank, such thing does not occur. Moreover, the shanks 1*e*, 1*f*, 1*g*, 1*h*, and 1*i* of the present embodiment, the cross sections of shank parts 1*e*-3, 1*f*-3, 1*g*-1, 1*h*-1 and 1*i*-1 which are installed upright to the shutter base plate 1, are circular corresponding to the shapes of the pores 1*j*, 1*k*, 1*m*, 1*n*, and 1*p*. If those cross-sectional forms are made to become non-circular such as an ellipse, a star-shape, etc., even when a degree of adhesion between those shanks and the shutter base plate 1 is small, an attachment intensity to the direction of rotation of those shanks can be obtained suitably.

In the present embodiment, the shanks 1*e*, 1*f*, 1*g*, 1*h* and 1*i* are fabricated by using the two color molding with the shutter base plate 1. When fabricating operation is completed, two main dies are separated in the direction of the plate thickness of the shutter base plate 1. In that case, since tip portions of the shank parts 1*e*-1 and 1*f*-1, and the set component attachment shank 1*g* of the present embodiment are formed thin gradually, and each of the grooves for sump are also linearly formed in the direction of the shank, it is not necessary to arrange dies which can be slid in the direction which intersects perpendicularly with the direction of separating the two dies mentioned above. Accordingly, separation of the dies can be carried out simply. Therefore, dies having a complicated constitution and an expensive molding machine are not needed, and manufacture by low cost can be achieved.

In the present embodiment, the shanks 1*e*, 1*f*, 1*g*, 1*h*, and 1*i* are fabricated together with the shutter base plate 1 by using the two color molding method. As for forming of the grooves for sump to the shanks 1*e*, 1*f*, and 1*g* according to the present embodiment, it can be applied when manufacturing is carried out by using simultaneous integral molding as shown in Japanese published unexamined patent application Toku Kai Hei No. 1-280739. Moreover, for example, when the shutter base plate 1 is manufactured beforehand as forming parts or metal parts, as shown in FIG. 5, and the shanks 1*e*, 1*f*, 1*g*, 1*h*, and 1*i* are fabricated by using another dies, forming of the grooves for sump can be fabricated easily according to he present embodiment. Therefore, the present invention can be applied also to those things manufactured mentioned above.

Although the shank parts 1*e*-1 and 1*f*-1, and the set component attachment shank 1*g* of the present embodiment have a large diameter part, a medium diameter part, and a small diameter part, the present invention does not hinder from forming the large diameter part and the medium size diameter part in the same thickness. Even in a case that a large diameter part and a medium size diameter part are formed according to the present embodiment, the grooves for sump can be formed on only one of either. In the present embodiment, all of four grooves for sumps formed at interval of the angle of 90 degrees have the same length. However, for example, the length can be changed alternately. Furthermore, the number is not restricted to four, and in some case, the number may be one. In fact, it is desired that two or more grooves are formed at the same interval of angle like the present embodiment. The grooves for sump of the present embodiment are formed to have cross sections of V shape like, as an example for easy separating of dies at the time of manufacture. However, the present invention is not limited to this form, and for example, the form may be almost U character SHAPE like, or may be other form.

Furthermore, in the present embodiment, grooves for sump 1*e*-8 and 1*f*-8 are formed in the shank parts 1*e*-2 and 1*f*-2. However, in some cases, it is not necessary to form the grooves 1*e*-8 and 1*f*-8 for sump in those shank parts 1*e*-2 and 1*f*-2. Therefore, according to the present invention, it is not necessary to form those shank parts 1*e*-2 and 1*f*-2, if the grooves for sump are formed in other attachment shanks. Moreover, in the present embodiment, the grooves for sump 1*g*-4 and 1*g*-5 are formed on the set component attachment shanks 1*g*. In some cases, it is not necessary to form the grooves for sump of the set component attachment shank 1*g*, and there is a case that the set component attachment shank 1*g* is made of metal, and the set component attachment shank 1*g* is not installed upright to the shutter base plate 1. Therefore, according to the present invention, it is not indispensable to form the grooves for sump of the set component attachment shank 1*g*.

Furthermore, actually, in some cases, the attachment shanks 1*e* and 1*f* are made of metal. Therefore, in the present invention, if the grooves for sump according to the present invention are formed on other attachment shanks, it is not indispensable to form also on the attachment shanks 1*e* and 1*f*. Especially, in case that a focal plane shutter having only one shutter blade is adopted for the camera having a progressive type CCD as a solid state image pickup element, since there is a case that as to closing operation of shutter blade, particularly severe restrictions may not be applied. In this case, even if a drive component attachment shank is made of synthetic resin, there are some cases in which there it is not necessary to form the grooves for sump on the drive component attachment shank. Therefore, the grooves for sump according to the present embodiment may be formed on whatever kind of attachment shank, if an attachment shank is made of synthetic resin and is installed upright to the shutter base plate, and to which the rotation component is attached.

On the shanks 1*e* and 1*f* in the present embodiment, as mentioned above, the power of a radial direction is applied by the drive springs 12 and 15. However, when a rotor is used as a drive component as shown in Publication of the Japanese unexamined patent application, Toku Kai No. 2004-101860, the power of the radial direction is not necessarily always acting on the attachment shank. However, when the drive pin and the shutter blade which are formed one with the rotor touches a stopper at the time of stop of the rotation, power generated by the impact acts greatly also to a radial direction of the attachment shank of the rotor. Therefore, even if an attachment shank of a rotation component is not rotated by the elastic compression power of a spring like a rotor, if it is fabricated like each of the shanks 1*e*, 1*f*, 1*g*, 1*h*, and 1*i* of the present embodiment, inclination and damage do not occur.

In the present embodiment mentioned above, explanation has been made to a case that the shutter base plate 1 has been fabricated first by the two color molding method, and then the shanks 1*e*, 1*f*, 1*g*, 1*h*, and 1*i* are fabricated. However, it is possible to fabricate the shanks 1*e*, 1*f*, 1*g*, 1*h*, and 1*i* first, and then fabricate the shutter base plate 1. Furthermore, after having fabricated the shutter base plate 1 as shown in FIG. 5 as primary processing parts by outsert fabrication, insert molding, etc. without using the two color molding method, the shanks 1e, 1f, 1g, 1h, and 1i may be fabricated by using another dies. On the contrary to this, after having fabricated hose shanks 1e, 1f, 1g, 1h, and 1i previously, the shutter base plate 1 can be fabricated by using another dies.

In the present embodiment, The liquid crystal polymer in which the glass fiber is mixed is used as a material of the shutter base plate 1 and the shanks 1e, 1f, 1g, 1h, and 1i. However, if there are suitable thermoplastic synthetic resin materials besides those mentioned above, such materials may be used. Moreover, the shutter base plate 1 and the shanks 1e, 1f, 1g, 1h, and 1i may be fabricated with different materials. Therefore, if a material excellent in the shank lubricity which is mixed with synthetic resin of fluorine group, or carbon black, etc., with the liquid crystal polymer etc. is adopted, as a material of the shanks 1e, 1f, 1g, 1h, and 1i, the rotation component can be suitably rotated. Furthermore, if the other material having almost same coefficient of expansion of the shutter base plate 1 is adopted as a material used for the shanks 1e, 1f, 1g, 1h, and 1i, even when the mutual degree of adhesion after molding is small, a suitable attachment intensity can be obtained.

Since the shutter base plate 1 and the shanks 1e, 1f, 1g, 1h, and 1i can be fabricated with different materials, for example, as a material of the attachment shanks 1e and 1f in the present embodiment, a material having almost same coefficient of expansion of the material of the drive components 9 and 13, can be adopted, and a material having almost same coefficient of expansion of the material of the set component 16 can be adopted as a material of the attachment shank 1g of the set component. Since a gap between each of the shanks 1e, 1f and 1g. and each of the components 9, 13, and 16 becomes as almost constant to temperature change, a running speed of each shutter blade by each of the drive components 9 and 13 is stabilized, and a set torque of the set component 16 will also be stabilized. Since in general, a thermoplastic resin having anisotropy such as acetate resin in which a load material is blended, etc., is often adopted as the material of each of the drive components 9 and 13 or the set component 16, it is desirable that in that case, a material used for each of the shanks 1e, 1f and 1g is the same, or the similar to the thermoplastic resin mentioned above.

The load material was blended. Conventionally, in order to prevent the diffused reflection of the light which has entered into a camera, a black coloring agent was added in the liquid crystal polymer which is the material of the shutter base plate. Therefore, each of the attachment shank has been simultaneously fabricated integrally as one by the same material together with the shutter base plate. However, a domain where each of the attachment shank is installed upright to the shutter base plate is a side area of the exposure aperture, and when a shutter unit is built in a camera, the area is isolated from an optical path of the photographic subject by well-known mirror box. Accordingly, as for each of the attachment shanks, manufacturing with such materials as mentioned is not necessarily demanded. Therefore, as to those attachment shanks, reduction of cost can be attained if it is fabricated by the synthetic resin which does not add a coloring agent, which is different from the material adopted as the shutter base plate.

In the present embodiment as mentioned above, after fabrication of the shutter base plate 1, all of the shanks 1e, 1f, 1g, 1h, and 1i, are fabricated by shifting a timing. However, for example, only the attachment shanks 1e and 1f that receive powerful power in a radial direction can be fabricated such as mentioned above, and the shanks 1g, 1h, and 1i can be simultaneously fabricated integrally as one together with the shutter base plate 1. Therefore, in case of a focal plane shutter having only one shutter blade, either of those attachment shanks 1e or 1f may be fabricated independently from the shutter base plate 1 by the two color molding method. Thus, the present invention is not limited to manufacturing of the shutter base plate 1 and the shanks 1e, 1f, 1g, 1h, and 1i by the two color molding method like the present embodiment. Furthermore, the shutter base plate 1 and the shanks 1e, 1f, 1g, 1h, and 1i may be fabricated with different materials, and all of the material of the shanks 1e, 1f, 1g, 1h, and 1i are not necessarily the same. Furthermore, it is not necessary that all of those shanks of are made of the synthetic resin, for example, the blade attachment shanks 1h and 1i can be made of metal, and those can be pressed and fitted into the shutter base plate 1, or may be fixed by caulking stop. Therefore, for each of the shanks, it is possible to choose a material corresponding to each function, and accordingly, also low cost production can be achieved. In the present invention, even when the shutter base plate 1 and the shanks 1e, 1f, 1g, 1h, and 1i are manufactured by the two color molding, these may be made of the same material.

Finally, explanation will be made of a partial modification of the embodiment in a state where fabrication of the shutter base plate and fabrication of the attachment shank have been completed. FIGS. 8A and 8B show modifications in a state that the attachment shanks 1f are installed upright, respectively. In the present embodiment mentioned above, as shown in FIG. 4, two flange-parts 1f-4 and 1f-5 are fabricated so as to put the shutter base plate 1 between them on the attachment shanks. And, as for the attachment shank 1f, a cross section of the shank part 1f-3 at position where it is installed upright is formed a circular shape, and the other flange portion is formed adjacent to a round projected portion formed on the shutter base blade 1.

Contrary to this, in a modification shown in FIG. 8A, a cross section of the shank part 1f-3 at a position where it is installed upright is an ellipse shape, and the other flange part 1f-4 is arranged adjacent to the shutter base plate 1 in a circular recess formed in the shutter base plate 1. Therefore, the flange-parts 1f-4 in the modification has a thickness thicker than that of the flange-part 1f-4 in the present embodiment. If the shank part 1f-2 is not formed, a shape of the attachment shank 1f of this modification, can be applied to the set-component attachment shank 1g and also tot the blade attachment shanks 1h and 1i in the present embodiment. In this modified example, it goes without saying that a cross-sectional form of the shank part 1f-3 at the position where it is installed upright may be made circular, or non-circular other than an ellipse.

In the modified example shown in FIG. 8B, the flange parts 1f-5 of the embodiment is not formed, and the diameter of the shank part 1f-3 at the position where it is installed upright is larger than that of the flange part 1f-4, wherein the shutter base plate 1 may wrap the two end surfaces of it. Therefore, thickness of the flange part 1*f*-4 is larger than that of the flange-parts 1*f*-4 also in this modified example. If the shank part 1*f*-2 is not formed, a shape of the attachment shank if of this modification, can be applied to the set component attachment shank 1*g* and also the blade attachment shanks 1*h* and 1*i* in the present embodiment. However, if it is made such as mentioned above, the shank part 1*f*-3 at the position where it is installed upright, is laid under the shutter base plate. In this modified example, it goes without saying that a cross-sectional form of the shank part 1*f*-3 at the position where it is installed upright may be made circular, or non-circular other than an ellipse.

On the shanks 1*e*, 1*f*, 1*g*, 1*h*, and 1*i* in the embodiment mentioned above, and the shank 1*f* in the two modified examples mentioned above, a flange part is formed respectively. However, when the degree of adhesion of those shanks and the shutter base plates 1 is obtained suitably, it is always not necessary to form those flange parts.

What is claimed is:

1. A focal plane shutter for cameras comprising,
a shutter base plate having an exposure aperture;
at least one shutter blade which consists of two or more arms, and
at least one blade pivoted by the arms wherein an end of the arms is individually attached rotatably to two or more blade attachment shanks which are installed upright to the shutter base plate; and
at least one drive component which is rotatably attached to the drive component attachment shank installed upright on the shutter base plate, and carries out opening and closing operations of the exposure aperture by the shutter blade by swinging one of the arms;
wherein
at least one attachment shank of two or more attachment shanks which are installed upright in order to install a rotation component including the drive component attachment shank is made of synthetic resin;
and
a long groove for sump is formed along the axial direction of the shank at a position where it is fitted into the rotation component at the circumferential side surface.

2. The focal plane shutter for cameras according to claim 1, wherein
at least one attachment shank is the drive component attachment shank.

3. The focal plane shutter for cameras according to claim 2, wherein
a part of the drive component attachment shank which is fitted into the drive component consists of two or more parts which are formed so that a diameter at a tip side may become smaller than that of the shutter-base-plate side, and
the groove for sump is formed in each of the two or more parts, respectively.

4. The focal plane shutter for cameras according to claim 1, wherein
at least one of the attachment shank is the blade attachment shank.

5. The focal plane shutter for cameras according to claim 4, wherein
the drive component is constituted so that it may be rotated by the energized power of a drive spring at the time of photographing;
the set component attachment shank for attaching the set component so as to enable to be rotated is installed upright on the shutter base plate; and
when setting is carried out the set component starts to rotate from an initial position while resisting the energized power of a return spring, and rotates the drive component to a set position while resisting the energized power of the drive spring, and returns to the initial position by the energized power of the return spring in advance of start of rotation of the drive component at the time of photographing; and
at least one of the attachment shanks is the set component attachment shank.

6. The focal plane shutter for cameras according to claim 5, wherein
a part of the set component attachment shank which is fitted into the set component consists of two or more parts which are formed so that a diameter at a tip side may become smaller than that of the shutter base plate side, and
the groove for sump is formed in each of the two or more parts, respectively.

7. The focal plane shutter for cameras according to claim 4, wherein
the two and more grooves for sump are formed in predetermined positions having angle interval of the attachment shank.

8. The focal plane shutter for cameras according to claim 4, wherein
the groove for sump is formed so as to have V letter shape when the attachment shank is perpendicularly cut to the axial direction of the shank.

9. The focal plane shutter for cameras according to claim 1, wherein
the drive component is constituted so that it may be rotated by the energized power of a drive spring at the time of photographing;
the set component attachment shank for attaching the set component so as to enable to be rotated is installed upright on the shutter base plate; and
when setting is carried out, the set component starts to rotate from an initial position while resisting the energized power of a return spring, and rotates the drive component to a set position while resisting the energized power of the drive spring, and returns to the initial position by the energized power of the return spring in advance of start of rotation of the drive component at the time of photographing; and
at least one of the attachment shanks is the set component attachment shank.

10. The focal plane shutter for cameras according to claim 9, wherein
a part of the set component attachment shank which is fitted into the set component consists of two or more parts which are formed so that a diameter at a tip side may become smaller than that of the shutter base plate side, and
the groove for sump is formed in each of the two or more parts, respectively.

11. The focal plane shutter for cameras according to claim 9, wherein
the two and more grooves for sump are formed in predetermined positions having angle interval of the attachment shank.

12. The focal plane shutter for cameras according to claim 1,
wherein
the two and more grooves for sump are formed in predetermined positions having angle interval of the attachment shank.

13. The focal plane shutter for cameras according to claim 12, wherein
the groove for sump is formed so as to have V letter shape when the attachment shank is perpendicularly cut to the axial direction of the shank.

14. The focal plane shutter for cameras according to claim 1,
wherein
the groove for sump is formed so as to have V letter shape when the attachment shank is perpendicularly cut to the axial direction of the shank.

* * * * *